Aug. 21, 1951     A. T. VAN URK     2,565,412
COIL SYSTEM FOR NONLINEAR RESPONSE
OF ELECTRICAL INSTRUMENTS
Filed July 20, 1946
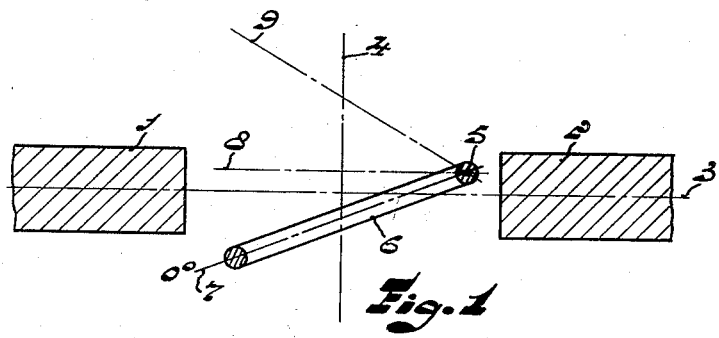
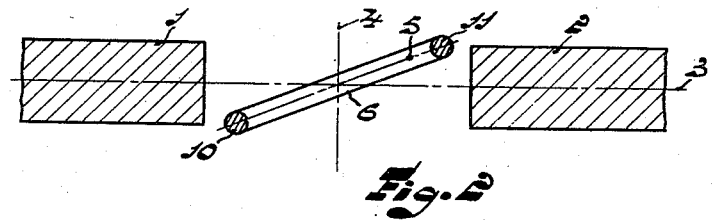
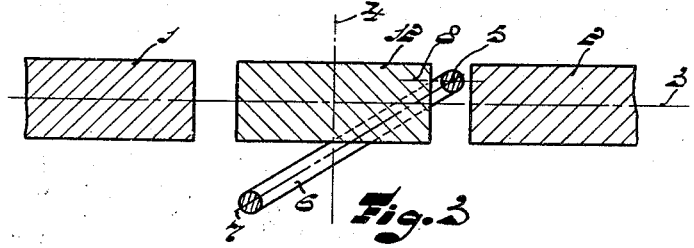
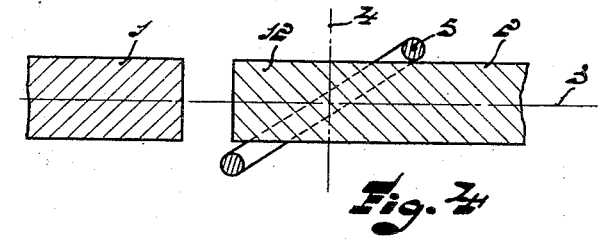
INVENTOR
AREND THOMAS VAN URK
BY
AGENT Patented Aug. 21, 1951

2,565,412

UNITED STATES PATENT OFFICE 2,565,412

COIL SYSTEM FOR NONLINEAR RESPONSE OF ELECTRICAL INSTRUMENTS

Arend Thomas van Urk, Eindhoven, Netherlands, assignor to Hartford National Bank and Trust Company, Hartford, Conn., as trustee Application July 20, 1946, Serial No. 685,164
In the Netherlands May 31, 1943

Section 1, Public Law 690, August 8, 1946
Patent expires May 31, 1963

4 Claims. (Cl. 171—95)

This invention relates to moving coil elements, particularly for use in electrical measuring instruments.

The invention is particularly applicable to measuring instruments in which the angular response of the moving coil element is non-linear with respect to the quantity to be measured, e. g. current or voltage. In order to obtain a satisfactory scale division and consequently a satisfactory angular displacement of the moving coil element, the magnetic field in which the conductors of the moving coil element move must have a configuration such that the field strength of the portion of the magnetic field in which the conductors are situated for a small deflection must have a relatively small value. At large deflections the field strength must increase reaching a maximum strength at some angular displacement of the coil element below the maximum deflection value and then decrease in strength until the maximum deflection is reached. In other words, the curve of field strength plotted against angular displacement should have a different slope as the maximum field strength value is approached from the slope of the curve as the maximum field strength is passed and the maximum angular displacement is reached.

Such a response curve may be attained particularly with coil systems having, for example, a logarithmical deflection as described in my co-pending applications for U. S. Patent Ser. Nos. 680,608, filed July 1, 1946, and 685,163, now abandoned, filed July 20, 1946 respectively. In the foregoing co-pending applications a moving coil system for measuring instruments is described wherein the coil is located in a field of non-uniform distribution and has a torque moment which varies non-linearly with the displacement of the coil with respect to its position of rest. This is accomplished by constituting the coil of two elements, one element being so arranged to be in a field having a substantially uniform distribution, whereas the other coil element is arranged to rotate in a field of non-uniform distribution in such manner that the resultant torque moment of the two coil elements corresponds to a desired non-linear displacement of the coil in response to a current flowing through the coil. The non-uniform field distribution is obtained by choosing an optimum relation between the pole face diameter of the magnets comprising the magnetic system of the meter and the width of the air-gap such that the flux in the air-gap will interact with the coils to produce the desired angular displacements of the coils in response to a current flowing through the coils.

The main object of this invention is to provide a moving coil element construction for a measuring instrument which has a preferred non-linear deflection in response to an applied force.

According to the invention, a coil system, particularly for measuring instruments, in which there exists a non-linear relation between the angular displacement of the coil with respect to the pole-pieces in response to an applied force has its axis of rotation provided outside the two axes of symmetry of the system. It is possible to utilize in this case constructions without iron core as well as constructions provided with an iron core.

The invention will be explained more fully with reference to the accompanying drawing, in which Fig. 1 shows in plan a diagrammatic view of core-less coil system according to the invention;

Fig. 2 shows in plan a diagrammatic view of another embodiment of a core-less coil system according to the invention;

Fig. 3 shows in plan a diagrammatic view of a coil system employing an iron core according to the invention, and Fig. 4 shows in plan a diagrammatic view of another coil system employing an iron core according to the invention.

In the several figures of the drawing the two poles of a moving-coil system are denoted by 1 and 2 while the two axes of symmetry are indicated by 3 and 4, 5 denotes axis of rotation of the coil 6.

According to the invention, the axis of rotation 5 of a coil 6 comprised by a plurality of turns of an electrical conductor is provided outside the axes 3 and 4. The correct locus of the centre of rotation is determined by the desired distribution of the field. In the case illustrated in Fig. 1 the coil occupies position 7 in case of a deflection of 0°. With an increasing deflection the current conductors pass through the range between 7 and 8, the field being at its maximum in the latter position. Between 7 and 8 the field distribution is such that the field strength increases in this region, that is, the field strength increases to an extent necessary to obtain the desired scale division. Beyond the position 8 of the field strength decreases up to the maximum deflection of the coil 6 in position 9. The slope of the curve of field strength as a function of angular displacement of the coil between the positions 8 and 9 is different from that between positions 7 and 8. By a proper choice of the position of the axis of rotation 3 it is possible to obtain the correct field distribution to be passed through by the current conductors.

In Figure 1 the centre of rotation has been so chosen that it exactly coincides with one half of the current conductors of the coil. This offers the advantage that the design of the coil system is simplified since the remainder of the current conductors affords only one moment. In the embodiment of the invention shown in Figure 2, the centre of rotation 5 is provided between the two halves of the current conductors 10 and 11. In this case there are concerned two moments whose resultant determines the deflection.

The previous embodiments employed core-less coils which rotate between the pole-pieces of the coil system of the measuring instrument. In Fig. 3 there is shown an embodiment of the invention in which an iron core 12 is provided around which the coil is wound. Fig. 3 shows the same general construction and in principle operates the same as the construction shown in Fig. 1. Fig. 4 shows a coil system similar to that of Fig. 2 employing, however an iron core 12 like in Fig. 3.

What I claim is:

1. A moving coil system for measuring instruments comprising a magnetic system including a pair of pole members of opposite polarity which are symmetrical about two orthogonal axes of symmetry and separated by an air-gap, and a coil member rotatable within said air-gap, said coil member comprising a plurality of current-conductor elements, and said coil member having an axis of rotation which coincides with an axis passing through one-half of the current-conductor elements, which axis is also eccentrically located with respect to the axes of symmetry of said pole members whereby the torque moment exerted on said coil resulting from the interaction of a current flowing in said coil, and the magnetic field in said air-gap, is produced by the torque-moment exerted by the other half of the current conductor elements of the coil.

2. A moving coil system for measuring instruments comprising a magnetic system including a pair of pole members of opposite polarity which are symmetrical about two orthogonal axes of symmetry and separated by an air-gap, and a coil member rotatable within said air-gap, the axis of rotation of said coil member being located within said coil member and eccentrically located with respect to the axes of symmetry of said pole members whereby the angular displacement of said coil member is non-linear in response to a change in the magnitude of a current flowing through said coil.

3. A moving coil system for measuring instruments comprising a magnetic system including a pair of pole members of opposite polarity which are symmetrical about two orthogonal axes of symmetry and separated by an air-gap, a core member of magnetic material disposed between said pole members and in said air-gap, and a coil member rotatable within said air-gap, the axis of rotation of said coil member being eccentrically located with respect to the axes of symmetry of said pole members whereby the angular displacement of said coil member is non-linear in response to a change in the magnitude of a current flowing through said coil.

4. A moving coil system for measuring instruments producing a non-linear displacement in response to current variations in the coil system, comprising a pair of spaced apart pole members of opposite polarity which are symmetrical about a plane passing through the pole members and which define an air-gap therebetween, a coil member comprising a plurality of conductor turns arranged to rotate between the poles and having a given axis of rotation spaced from and parallel to the plane of symmetry of the pole members, the axis of rotation of the coil member being spaced from said plane of symmetry a distance at which the coil member rotates through a field having a given value of strength from a normal position of rest to a position of maximum field strength in a shorter distance than the distance between the position of maximum field strength and a position of maximum deflection and passes through a field in the latter distance having a value of strength different than said given field strength value.

AREND THOMAS van URK.

REFERENCES CITED

The following references are of record in the file of this patent:

UNITED STATES PATENTS

| Number | Name | Date |
|---|---|---|
| 644,859 | Hoyt | Mar. 6, 1900 |
| 1,118,678 | Patrick | Nov. 24, 1914 |
| 1,671,473 | Jacobson | May 29, 1928 |
| 1,782,588 | Terman | Nov. 25, 1930 |
| 1,918,023 | Faus | July 11, 1933 |

FOREIGN PATENTS

| Number | Country | Date |
|---|---|---|
| 172,776 | Germany | Dec. 21, 1905 |
| 413,835 | France | Feb. 13, 1911 |
| 518,919 | Great Britain | Mar. 12, 1940 |